United States Patent
Kuo et al.

(10) Patent No.: US 7,764,271 B2
(45) Date of Patent: Jul. 27, 2010

(54) METHOD OF MANUFACTURING AN OPTICAL MODULE

(75) Inventors: Cheng-Chung Kuo, Taipei (TW); Ho-Feng Chiu, Taipei Hsien (TW); Jen-Chun Weng, Taipei (TW); Chen-Hsiu Lin, Taipei Hsien (TW)

(73) Assignee: Lite-On Technology Corp., Taipei (TW)

( * ) Notice: Subject to any disclaimer, the term of this patent is extended or adjusted under 35 U.S.C. 154(b) by 1221 days.

(21) Appl. No.: 11/307,102

(22) Filed: Jan. 24, 2006

(65) Prior Publication Data

US 2007/0059867 A1 Mar. 15, 2007

(30) Foreign Application Priority Data

Sep. 13, 2005 (TW) .............................. 94131505 A (51) Int. Cl.
G09G 5/08 (2006.01)
(52) U.S. Cl. ...................... 345/166; 438/128
(58) Field of Classification Search .......... 345/156–175
See application file for complete search history.

(56) References Cited

U.S. PATENT DOCUMENTS

| | | | |
|---|---|---|---|
| 4,409,479 A | 10/1983 | Sprague | |
| 6,421,045 B1 * | 7/2002 | Venkat et al. ............... | 345/167 |
| 6,564,168 B1 | 5/2003 | Hasser | |
| 6,697,052 B2 | 2/2004 | Shen | |
| 6,928,386 B2 | 8/2005 | Hasser | |
| 7,148,078 B2 * | 12/2006 | Moyer et al. ................. | 438/65 |
| 2003/0007084 A1 | 1/2003 | Nakjoh | |
| 2003/0025826 A1 | 2/2003 | Nakajoh | |
| 2003/0142078 A1 * | 7/2003 | Chin .......................... | 345/166 |
| 2003/0201951 A1 | 10/2003 | Chin | |
| 2004/0208348 A1 * | 10/2004 | Baharav et al. ............. | 382/124 |
| 2005/0186710 A1 | 8/2005 | Moyer | |

FOREIGN PATENT DOCUMENTS

| | | |
|---|---|---|
| CN | 1661788 A | 8/2005 |
| JP | S62-133774 | 6/1987 |
| JP | 2000-219363 | 8/2000 |
| JP | 2001-245217 | 9/2001 |
| JP | 2001-257944 | 9/2001 |
| JP | 2003-298103 | 10/2003 |
| JP | 2005-191660 | 7/2005 |
| TW | 549490 | 8/2003 |
| TW | M247947 | 10/2004 |
| TW | 1229430 | 3/2005 |

* cited by examiner

*Primary Examiner*—Richard Hjerpe
*Assistant Examiner*—Carolyn R Edwards
(74) *Attorney, Agent, or Firm*—Rosenberg, Klein & Lee (57) ABSTRACT

Manufacturing an optical module includes providing a frame, attaching a light-emitting diode chip and a sensor chip to the frame, and forming overcoats on the light-emitting diode chip and the sensor chip. Each of the overcoats includes a lens. The overcoats can prevent internal chips from being damaged and suffering dust contamination during manufacture.

14 Claims, 14 Drawing Sheets

METHOD OF MANUFACTURING AN OPTICAL MODULE

BACKGROUND OF THE INVENTION

1. Field of the Invention

The present invention relates to a method of manufacturing an optical module, and more particularly, to a method of forming an overcoat including a lens to protect elements of an optical module.

2. Description of the Prior Art

An optical mouse comprises a light-generating system and an imaging system. The light-generating system is composed of a light-emitting diode (LED), a holder, and a lens component. The imaging system is composed of a lens (positioned inside the lens component), a mold, a sensor chip, a conductive frame, and an aperture. The details are as follows.

Figure 1:
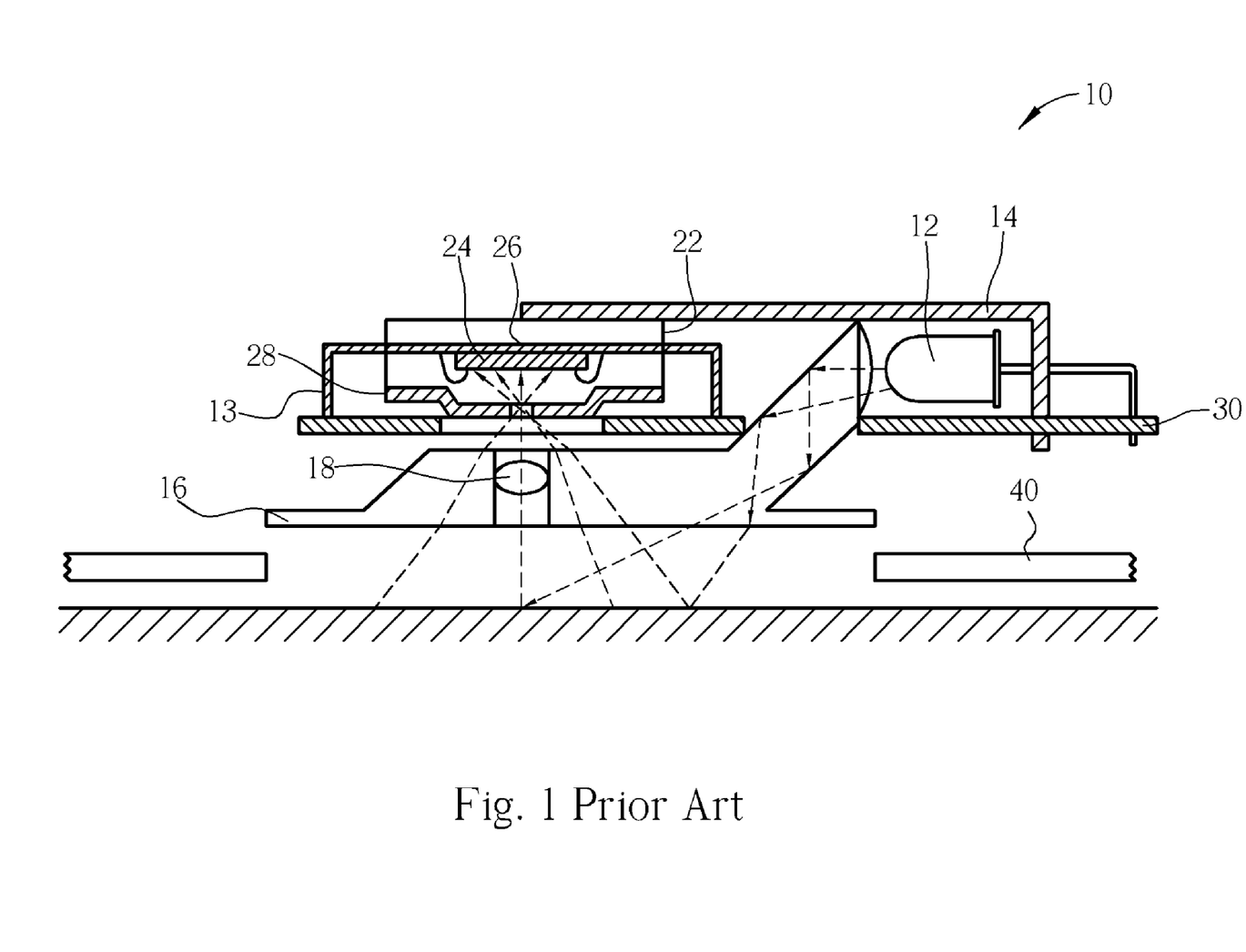
FIG. 1 is a cross-sectional view of an optical mouse according to the prior art.
Figure 3:
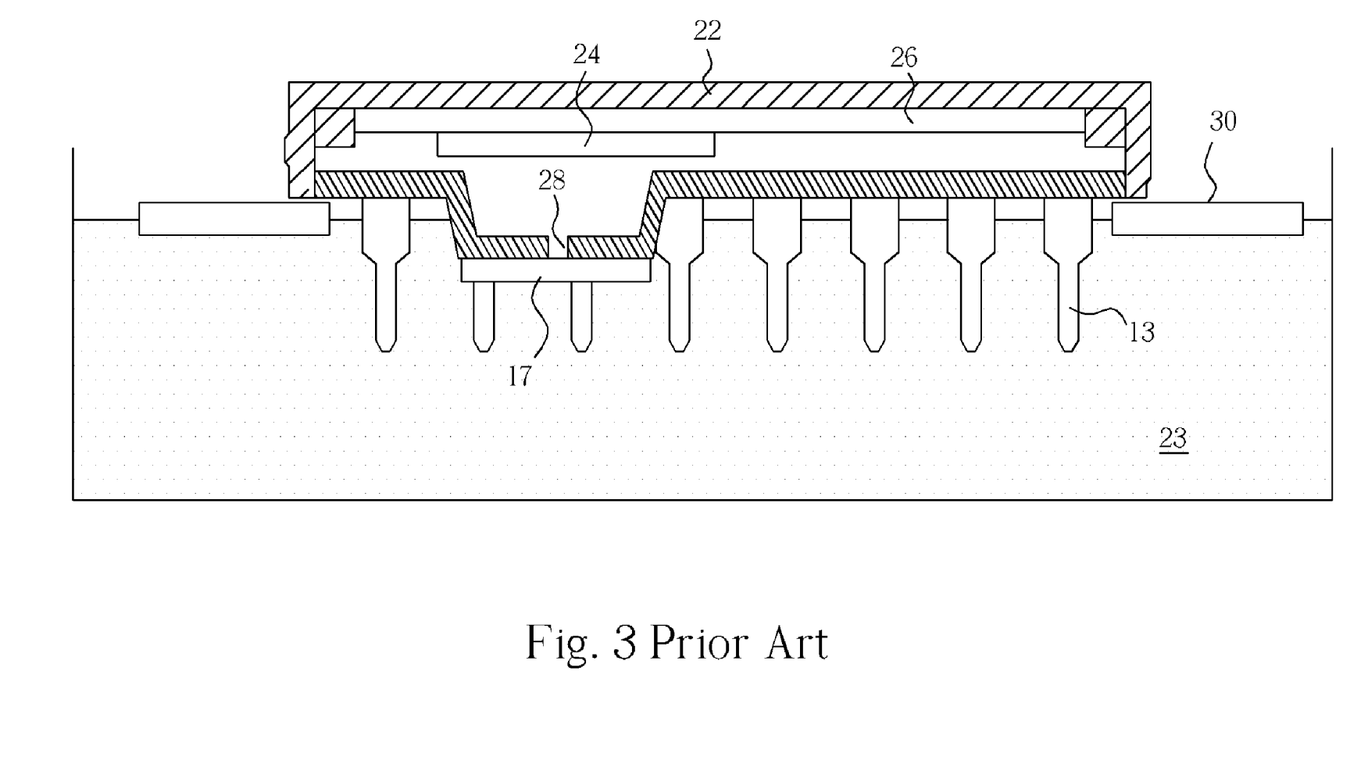
FIG. 3 shows how the mold of FIG. 1 is welded on the PCB of FIG. 2.

Please refer to FIG. 1, which is a cross-sectional view of an optical mouse 10 according to the prior art. First, a conductive frame 26 having a plurality of pins 13 (as shown in FIG. 3) is provided. A sensor chip 24 is then attached to the conductive frame 26 and bond wires to connect the sensor chip 24 and the conductive frame 26. Next, the conductive frame 26 is fixed onto a mold 22. The mold 22 is like a container formed by an injection molding process for protecting the sensor chip 24, and comprises a lower cover. The aperture 28 is capable of filtering out undesirable light to improve imaging quality.

Figure 2:
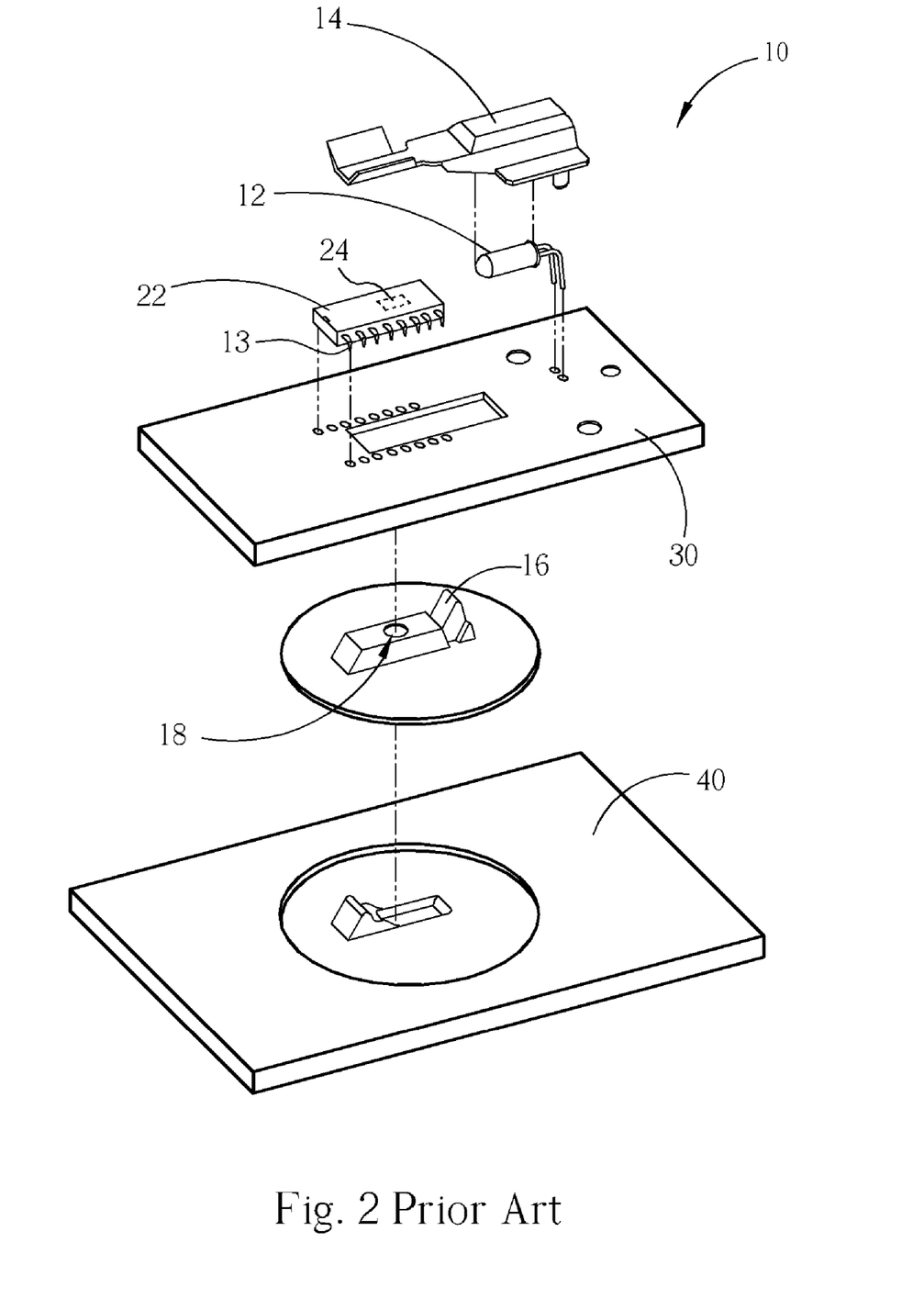
FIG. 2 is an exploded view of the optical mouse of FIG. 1.

Please refer to FIG. 2, which is an exploded view of the optical mouse 10 of FIG. 1. The holder 14 is capable of holding the light-emitting diode 12. A printed circuit board (PCB) 30 is positioned above the lens component 16, and is connected to the conductive frame 26 and the holder 14 for assisting in fixing the sensor chip 24 and the light-emitting diode 12.

Please refer to FIG. 3, which shows how the mold 22 of FIG. 1 is welded on the PCB 30. An adhesive tape 17 is attached to the aperture 28, as shown in FIG. 3, for preventing the sensor chip 24 from being damaged by welding fluid 23 when the mold 22 is welded on the PCB 30. The pins 13 of the conductive frame 26 are inserted into a plurality of holes on the PCB 30 correspondingly for fixing the mold 22 onto the PCB 30.

A part of the PCB 30 and a part of the mold 22 are soaked in the welding fluid 23. Since the welding temperature is relatively high and the adhesive tape 17 is heat-resistant, the adhesive tape 17 can prevent the sensor chip 24 from being damaged by high temperature or by the welding fluid 23. However, the adhesive tape 17 must be taken off after the welding is done. After that, assembly or test of the optical mouse 10 can be executed. If the optical mouse 10 has a defect that has to be fixed, the adhesive tape 17 must be attached to the aperture 28 to prevent the sensor chip 24 from dust contamination.

Finally, the combination of the imaging system and the light-generating system is fixed onto a base 40 to complete the manufacture of the optical mouse 10.

From the above, the manufacturer of the traditional optical mouse 10 has to purchase the sensor chip 24, the lower cover having the aperture 28, and the adhesive tape 17 to integrate all elements and the mold 22. Furthermore, the manufacturer has to order the LED 12, the lens component 16, and the lens 18 (installed in the lens component 16), and then assembles the optical mouse 10. It is very inconvenient for the manufacturer to order these elements from different suppliers, and integrating many elements makes the assembly complex and difficult. Additionally, the prior art method tests each element respectively, and then assembles the optical mouse 10. Therefore, the lens 18 and the sensor chip 24 must be positioned precisely, and the lens component 16 and the LED 12 must be positioned precisely so that the light emitted from the LED 12 is capable of directly traveling into the lens component 16. Otherwise, the sensitivity of the optical mouse 10 will be adversely affected.

SUMMARY OF THE INVENTION

It is therefore a primary objective of the claimed invention to provide a method of manufacturing an optical module to solve the above-mentioned problem.

The claimed invention discloses a method of manufacturing an optical module. The method comprises providing a frame, attaching a light source to the frame, forming an overcoat including a lens on the light source, and attaching a sensor module to the frame.

These and other objectives of the present invention will no doubt become obvious to those of ordinary skill in the art after reading the following detailed description of the preferred embodiment that is illustrated in the various figures and drawings.

DETAILED DESCRIPTION

In order to solve problem above, the present invention provides a method of manufacturing an optical mouse and an assembly of such. Please refer to FIG. 4 to FIG. 8, showing each step of the manufacture.

Figure 4:
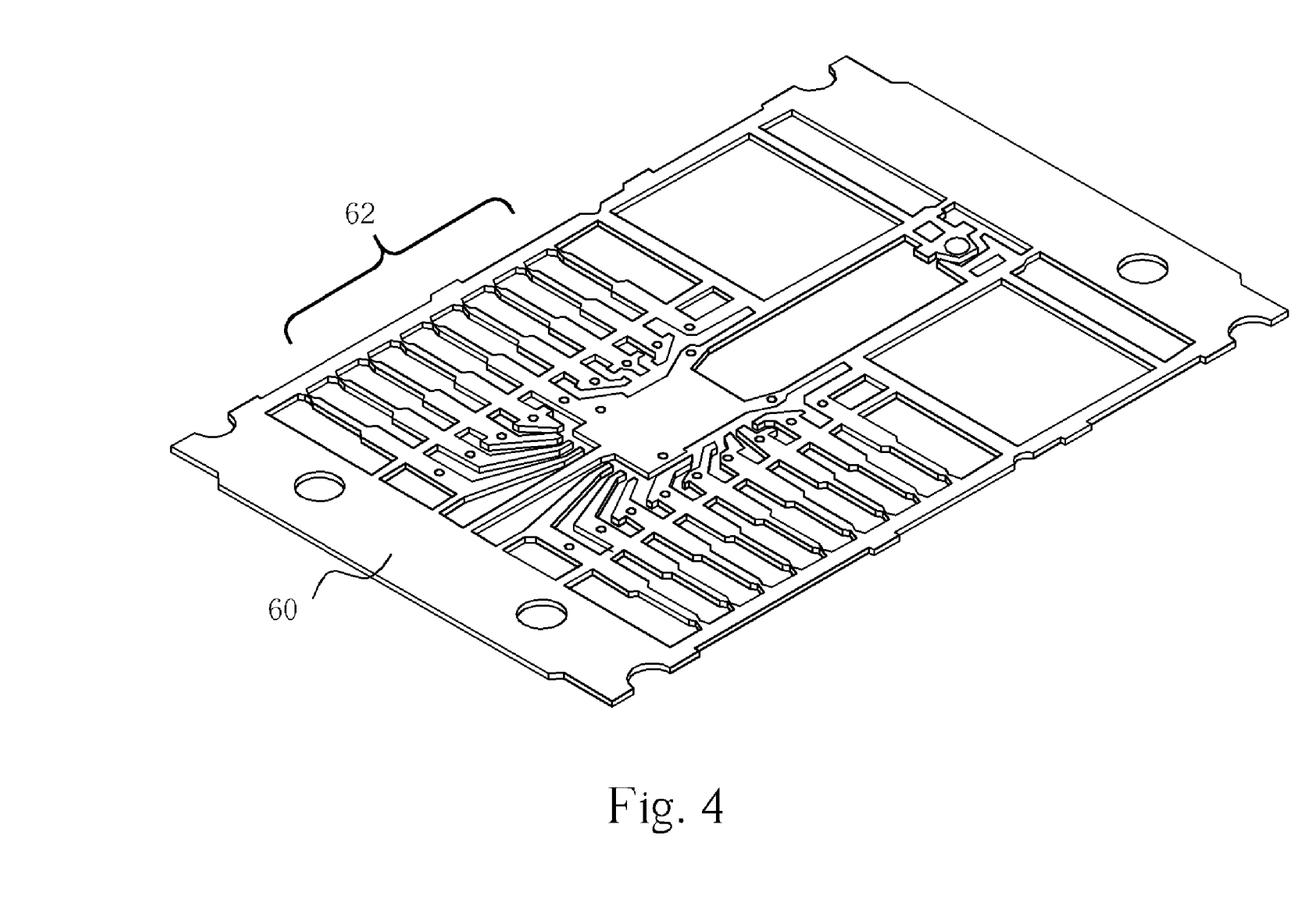
FIG. 4 to FIG. 8 show each step of the manufacture according to the present invention.
Figure 5:
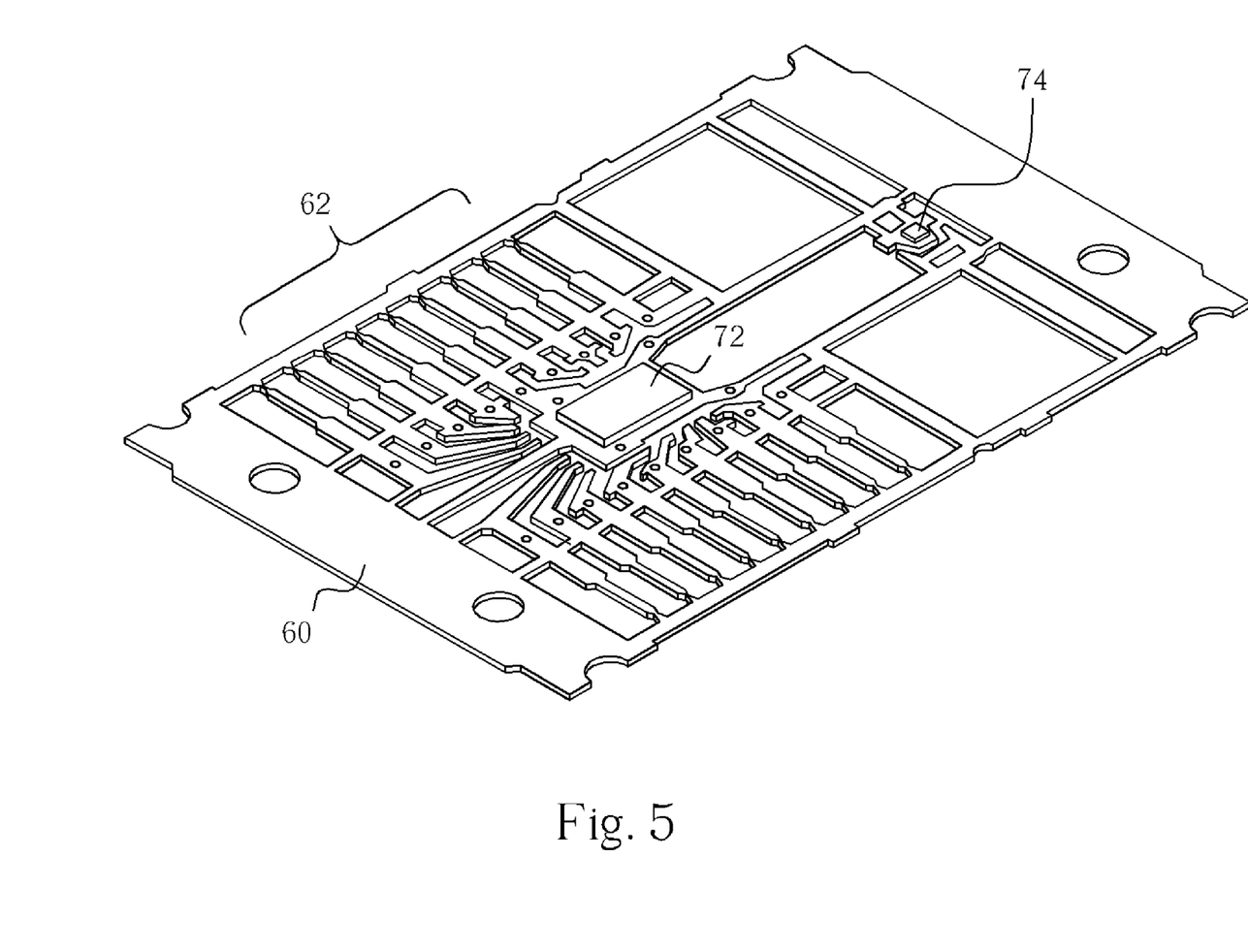
Figure 6:
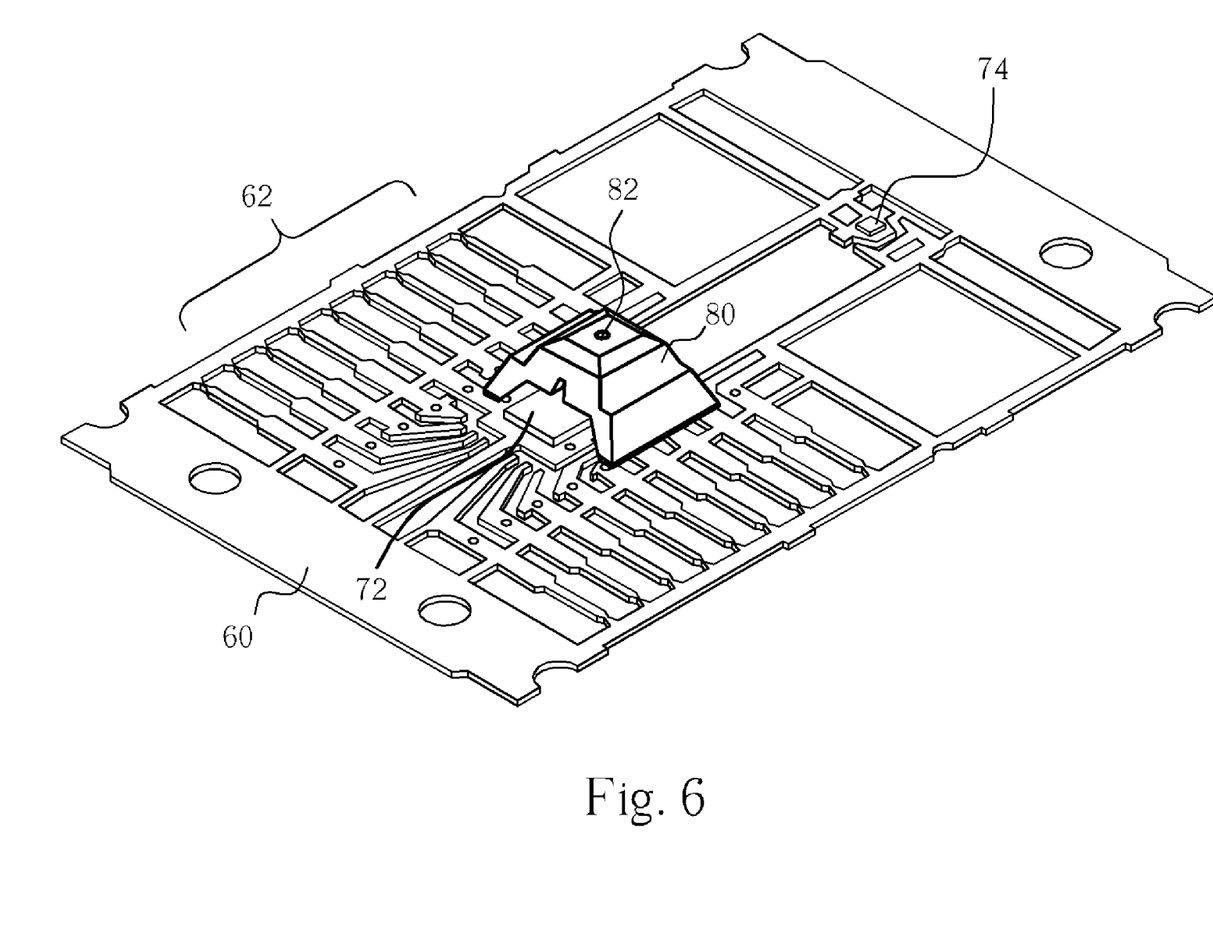
Figure 7:
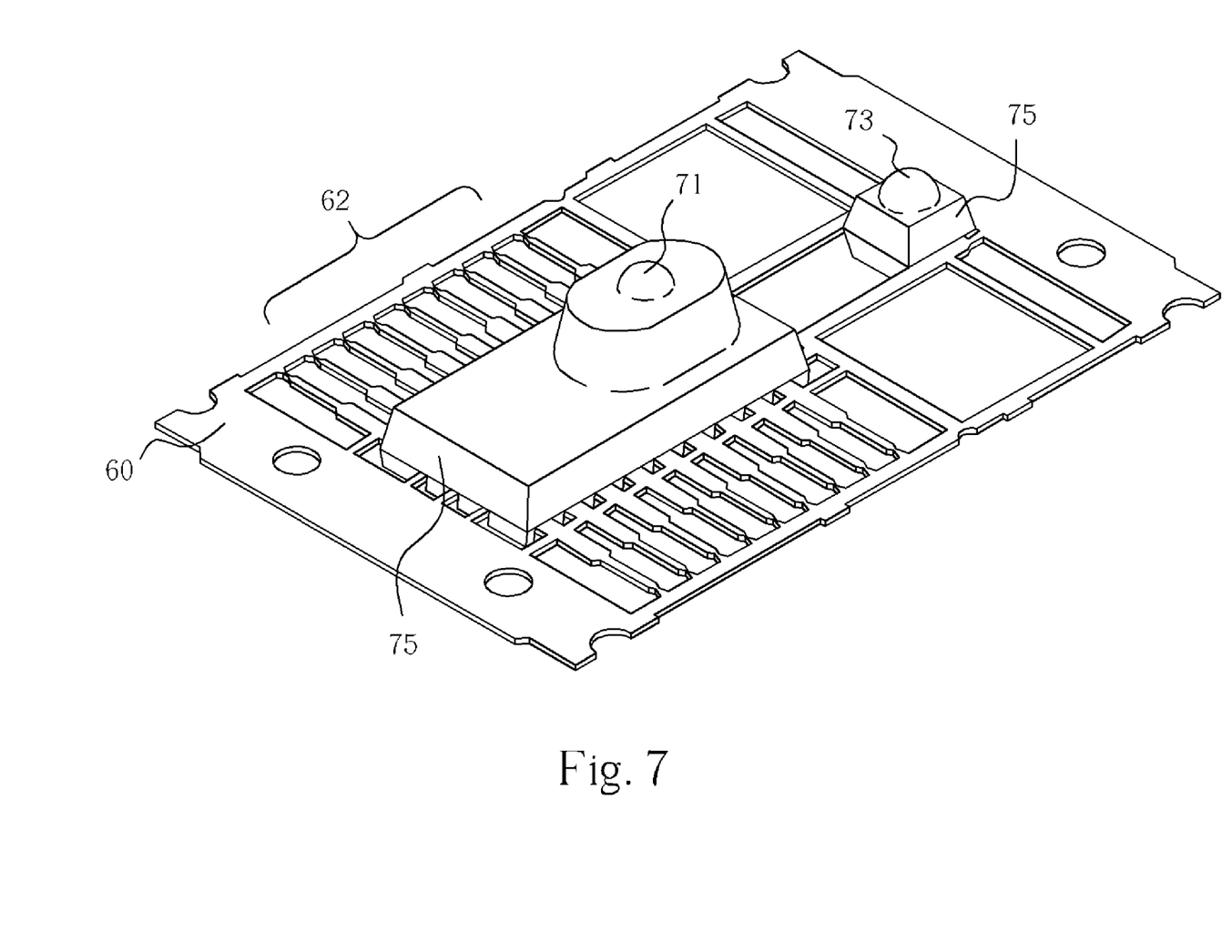

First, a conductive frame 60 having a plurality of pins 62 is provided as shown in FIG. 4. Next, a sensor chip 72 and an LED chip 74 are attached to the conductive frame 60, and bond wires connect the sensor chip 72 and the LED chip 74 to the conductive frame 26. As shown in FIG. 5, there is a part of the conductive frame 60 between the sensor chip 72 and the LED chip 74. In FIG. 6, a cover 80 is fixed onto the conductive frame 60, and an aperture 82 is formed on the cover 82 to be positioned over a light-sensing area of the sensor chip 72. The material of the cover 80 can be plastics or other materials. In FIG. 7, a molding process is performed. The sensor chip 72 and the LED chip 74 are entirely covered with overcoats 75, and part of the overcoats 75 form lenses 71, 73 respectively. The material of the overcoat 75 is epoxy, or a thermosetting compound capable of bearing high temperatures of around 265° C. If the overcoat 75 is transparent epoxy, the LED chip 74 is selected from a group consisting of a visible light LED chip (such as a red, blue, or green LED chip) and a laser diode (LD) chip. If the overcoat 75 is opaque epoxy but pervious to infrared (IR) rays, the LED chip 74 should be an IR LED chip. The material of the overcoat 75 is not limited to the above.

Any material capable of protecting chips or forming lenses can be used with the present invention.

Figure 8:
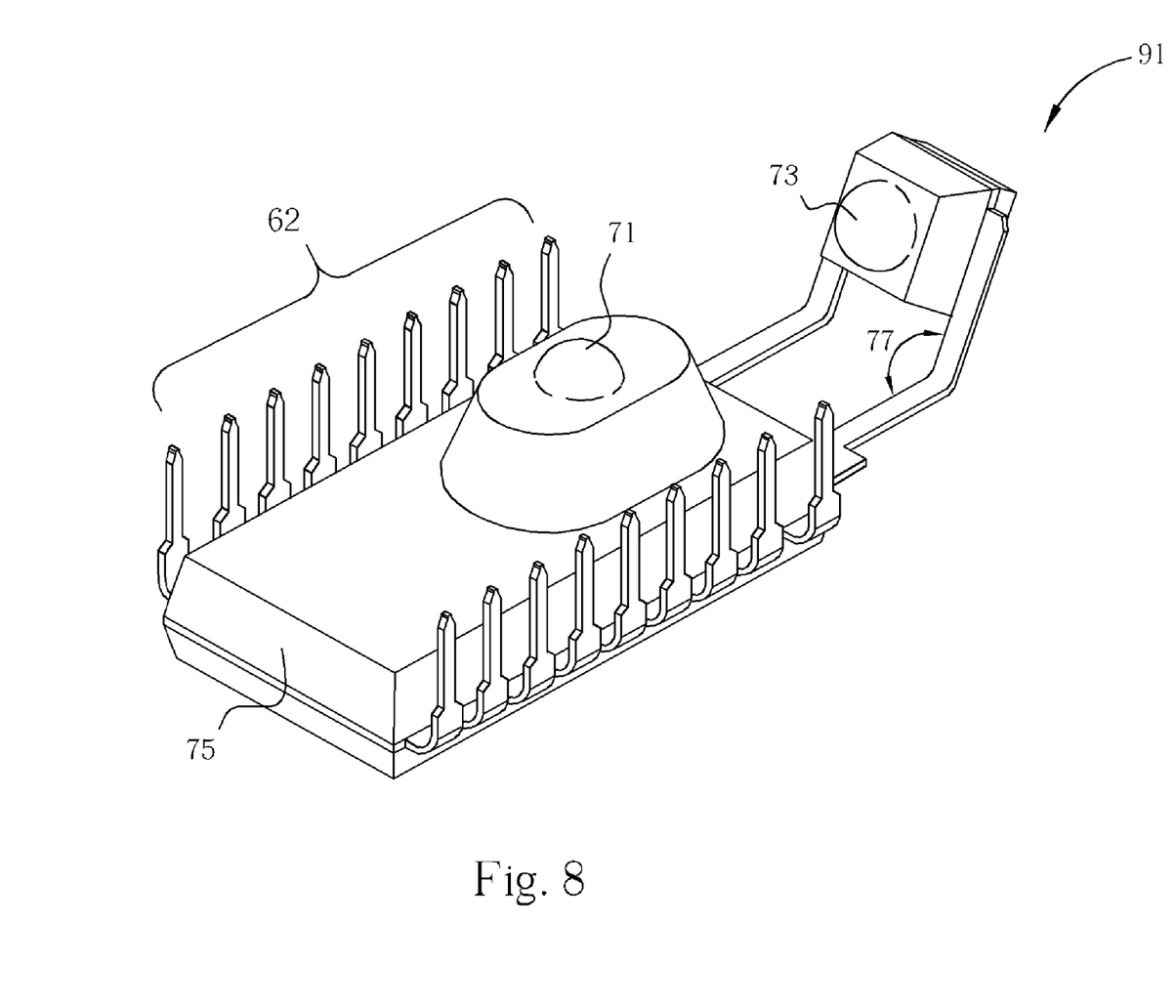

Finally, as shown in FIG. 8, the plurality of pins 62 of the conductive frame 60 are bent, and the part of the conductive frame 60 between the sensor chip 72 and the LED chip 74 is bent to form an angle 77. Then, the optical module 91 in FIG. 8 is completed. The details about the angle 77 are described later.

Figure 9:
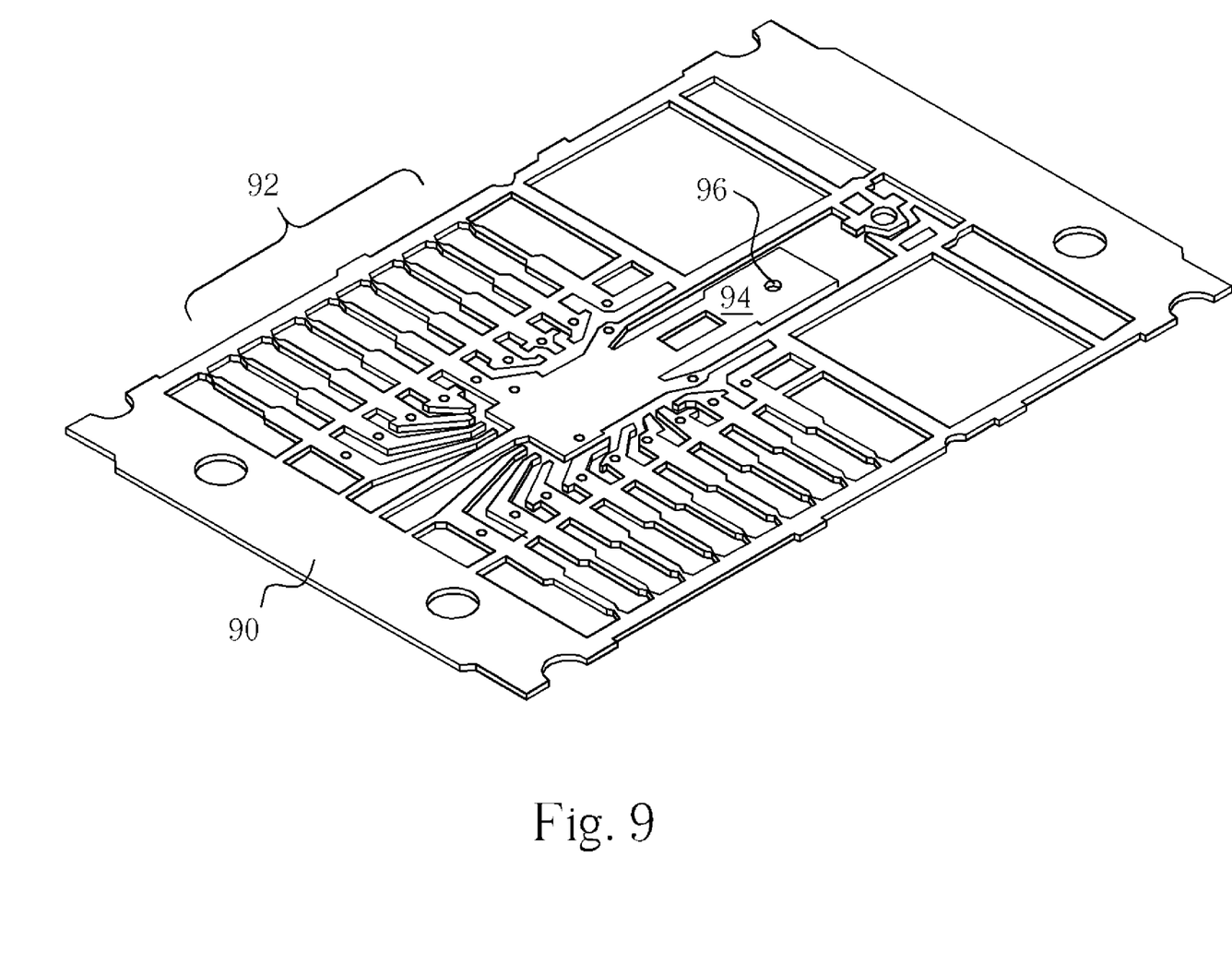
FIG. 9 is another embodiment of the conductive frame according to the present invention.

The installment of the aperture is not limited to the example of FIG. 6. For instance, an aperture 96 is formed on an arm 94 extended from a conductive frame 90 in FIG. 9, the conductive frame 90 having a plurality of pins 92. After the extended arm 94 is bended, the aperture 96 is positioned over a light-sensing area of the sensor chip 72, as shown in FIG. 10, such that focused light can be projected to the sensor chip 72.

Figure 11:
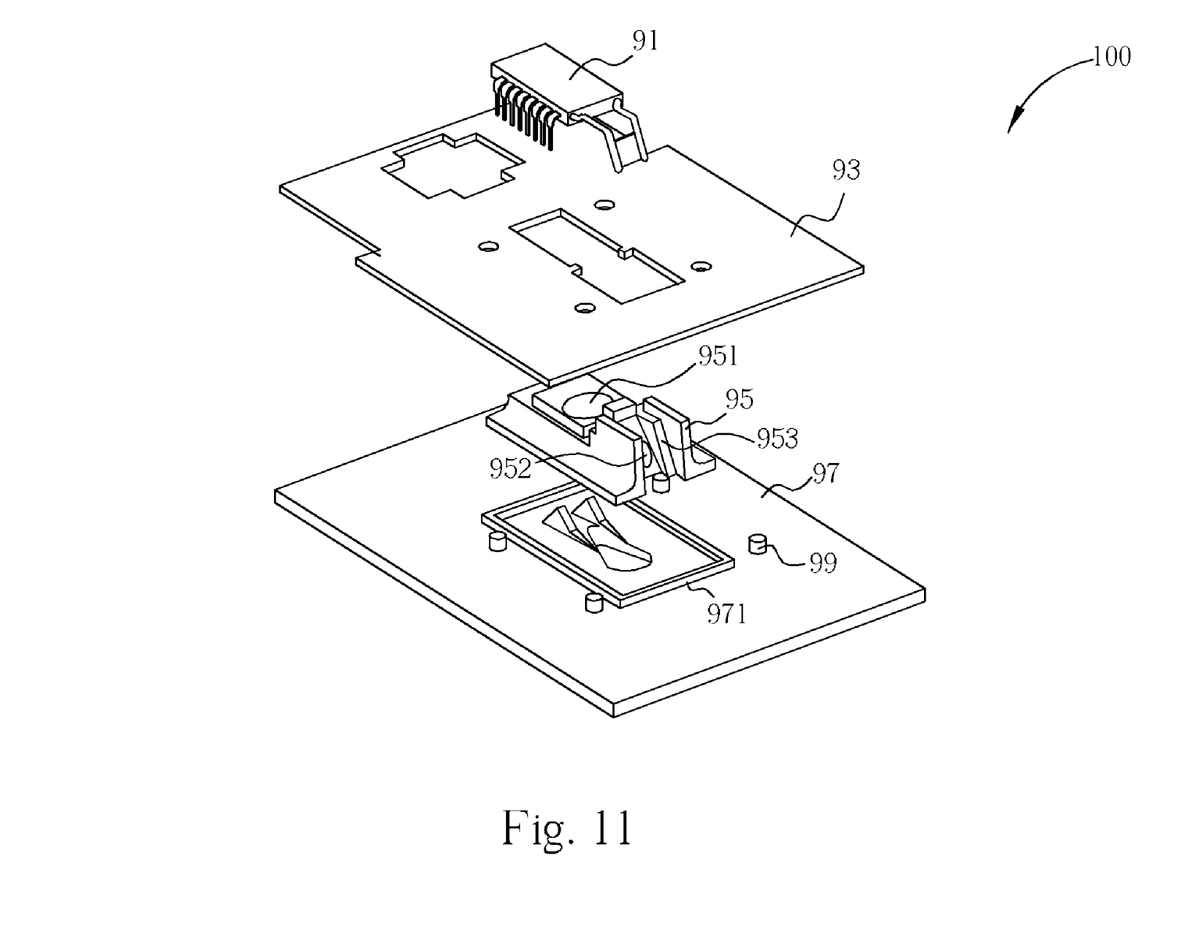
FIG. 11 and FIG. 12 are exploded views of different embodiments for assembling the optical mouse of the present invention.
Figure 12:
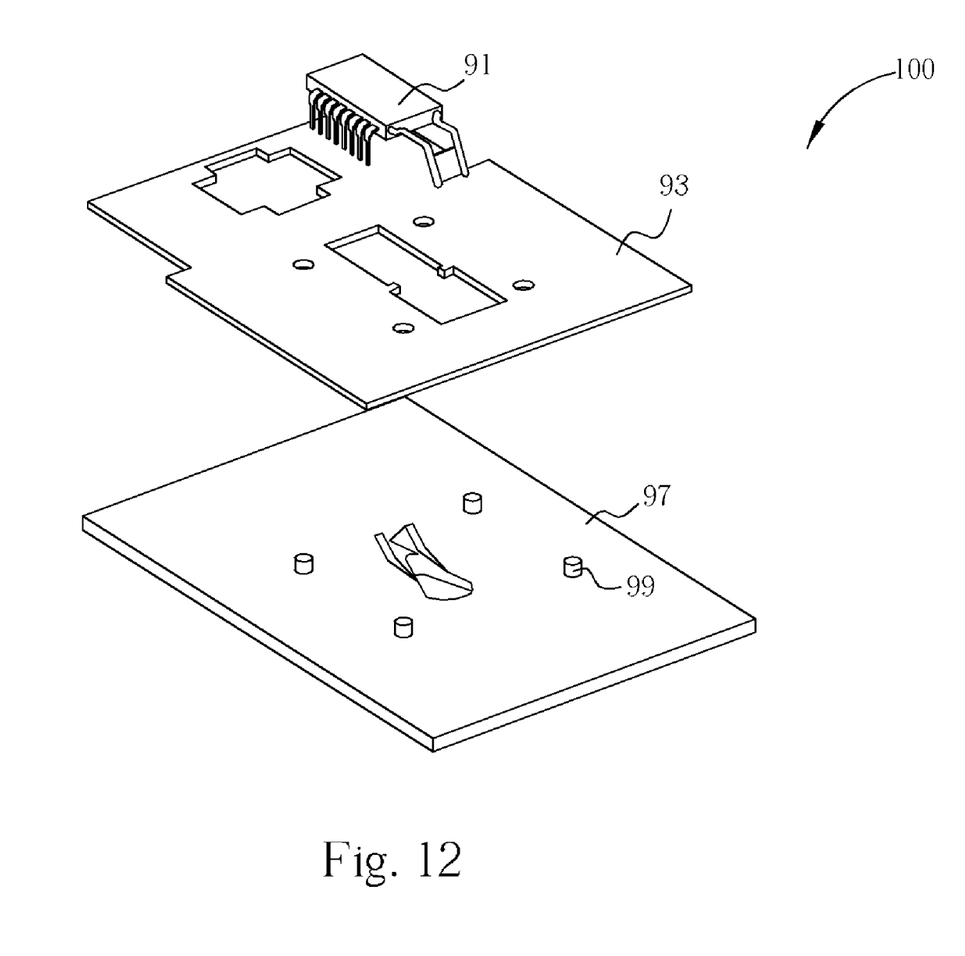

With the optical module 91, the present invention can simplify the structure of the optical mouse as shown in FIG. 11. FIG. 11 is an exploded view of an optical mouse 100 according to the present invention. A holder 95 comprises two holes 951, 952, and an inclined plane 953. The holes 951, 952 respectively accommodate the lenses 71, 73, and the inclined plane 953 supports the angle 77 to prevent the angle 77 from being changed due to external force. The holder 95 is fixed inside an oblong frame 971 of a base 97. When assembling the optical mouse 100, the pins 62 of the optical module 91 of FIG. 8 are welded onto a printed circuit board (PCB) 93. Then, the PCB 93 is fixed onto the posts 99 of the base 97. The holder 95 can support the optical module 91 to ensure the position of such. Additionally, the holder 95 can be omitted as shown in FIG. 12. In FIG. 12, there is no holder, and after the optical module 91 is welded onto the PCB 93, the PCB 93 is fixed onto the posts 99 of the base 97.

Figure 13:
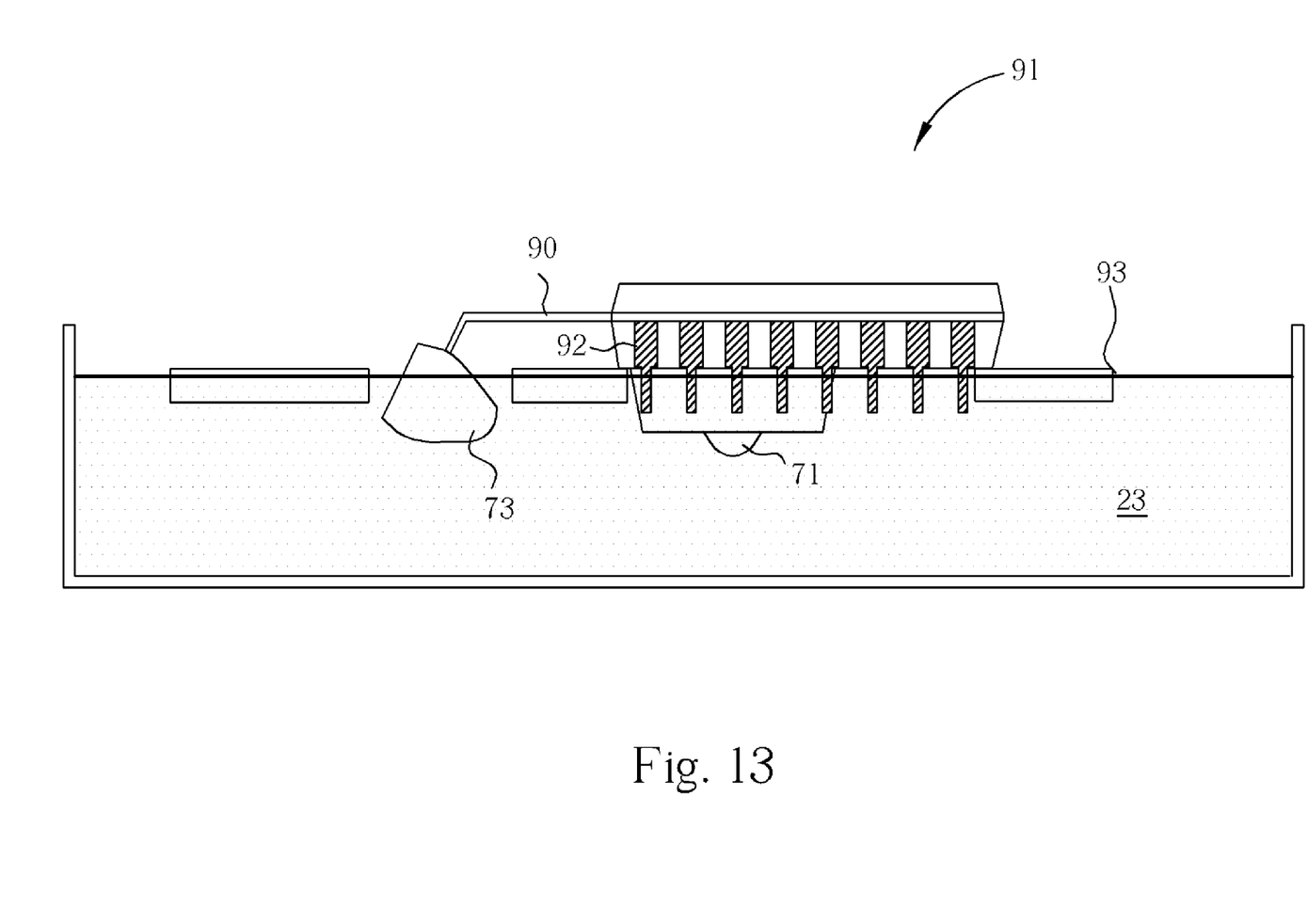
FIG. 13 shows how the optical module of FIG. 8 is welded on the PCB of FIG. 11.

The overcoat 75 is made of a heat-resistant material, and thereby prevents the chips 72, 74 from damage by high temperature and the welding fluid 23 when welding the optical module 91 onto the PCB 93, as shown in FIG. 13. The present invention does not have to attach the adhesive tape 17 to protect chips, and thereby simplifies the steps of manufacture.

Figure 10:
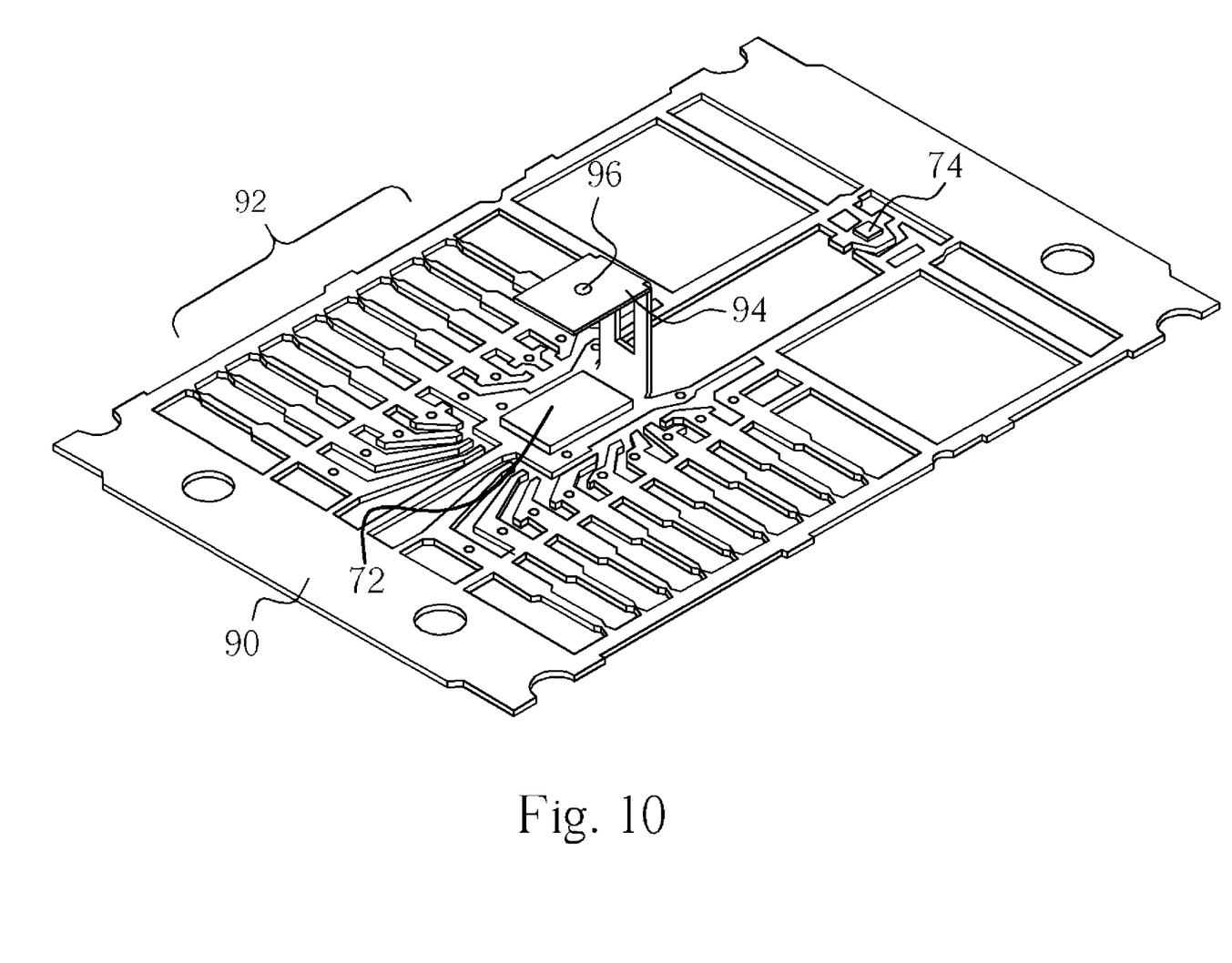
FIG. 10 is another embodiment of the aperture according to the present invention.
Figure 14:
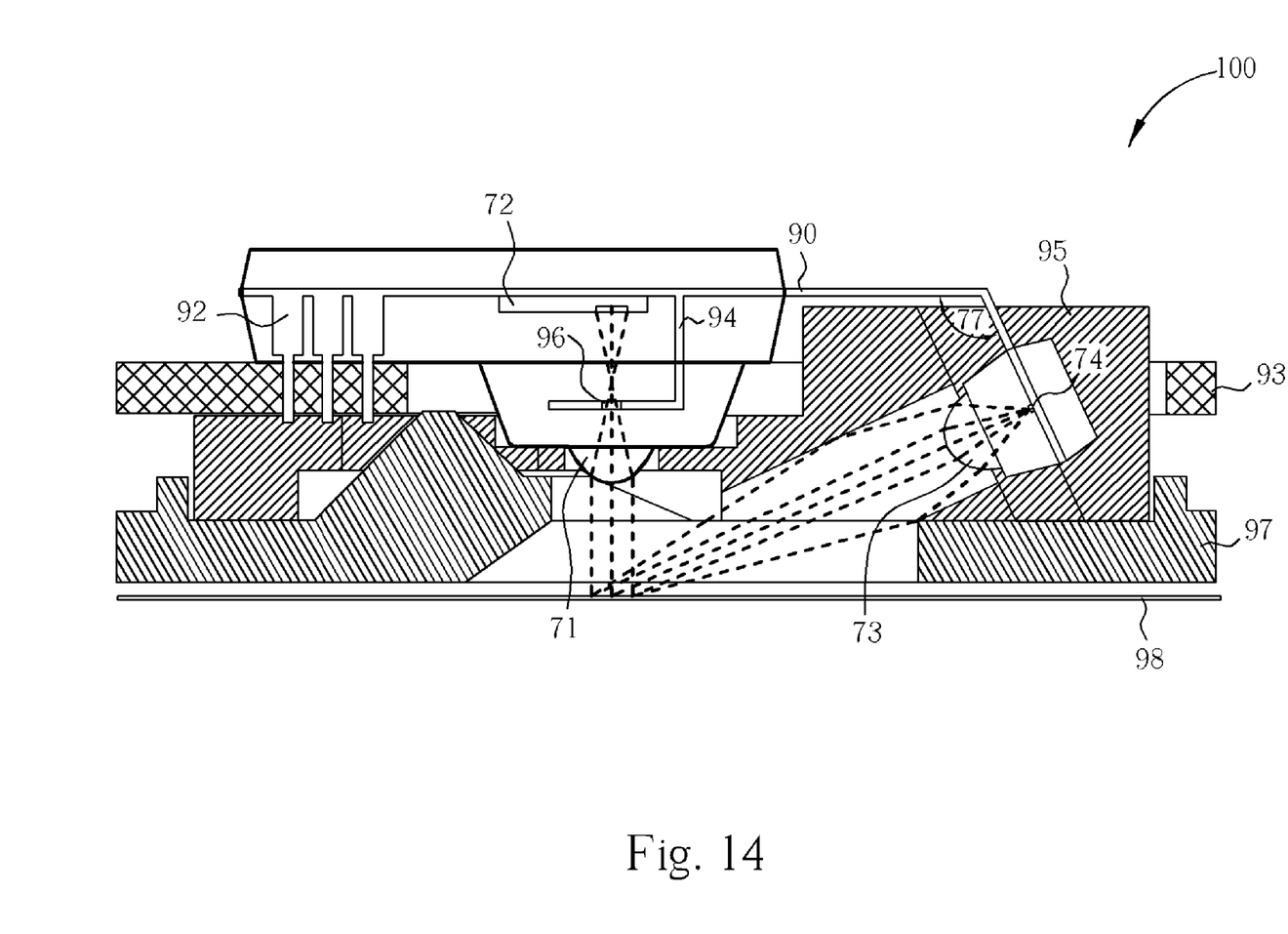
FIG. 14 is a cross-sectional view of the optical mouse according to the present invention.

Please refer to FIG. 14, which is a cross-sectional view of the optical mouse 100 according to the present invention adopting the aperture 96 of FIG. 10. In FIG. 14, the conductive frame 90 between the sensor chip 72 and the LED chip 74 must be bent to the angle 77. The angle 77 must be appropriate to ensure light refracted by the lens 73 can be projected onto the surface 98 under the light-sensing area of the sensor chip 72. The angle 77 is preferably within a range of 60° and 85°.

Compared to the prior art, the present invention replaces a traditional lens with lens formed from overcoats on the sensor chip and the LED chip. Since the overcoats are heat-resistant, the overcoats can prevent internal chips from being damaged and suffering dust contamination during welding. Additionally, the sensor chip and the LED chip are both positioned on the conductive frame, thus only bending the frame to an angle is needed to position the two chips. Therefore, the present invention can simplify the structure of an optical mouse. After the optical mouse of the present invention is assembled, the optical mouse can be directly tested on the top of a table, which is a better test method than that of the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of manufacturing an optical module, the method comprising:
   providing a conductive lead frame having an arm portion formed therein, the arm portion having an aperture formed therethrough;
   attaching an optical sensor chip to the lead frame;
   attaching a light source to the lead frame spaced from the optical sensor chip;
   bending the arm portion of the lead frame to position the aperture in correspondence with a light-sensing area of the optical sensor chip; and
   encapsulating both the light source and the optical sensor chip and bent arm portion to form a package assembly, the encapsulation step including forming a first lens on the light source and forming a second lens in correspondence with the light-sensing area of the optical sensor chip and the aperture of the bent arm portion, the bent arm portion being disposed between the second lens and the light-sensing area of the optical sensor chip.

2. The method of claim 1 further comprising fixing a plurality of pins extended from the lead frame onto a circuit board.

3. The method of claim 2 further comprising fixing the package assembly onto a holder.

4. The method of claim 3 further comprising fixing the holder onto a base.

5. The method of claim 1 further comprising bending the lead frame at a position between the optical sensor chip and the light source at an angle that allows the optical sensor chip to sense light emitted from the light source and reflected from a surface.

6. The method of claim 5, wherein the step of bending the lead frame at an angle includes the step of bending the lead frame to an angle within a range of 60 degrees to 85 degrees.

7. The method of claim 1, wherein the step of attaching a light source to the lead frame includes the step of attaching a light-emitting diode to the lead frame.

8. A method of manufacturing an optical module, the method comprising:
   providing a conductive lead frame having an arm portion formed therein, the arm portion having an aperture formed therethrough;
   attaching an optical sensor chip to the lead frame;
   bending the arm portion of the lead frame to position the aperture in correspondence with a light-sensing area of the optical sensor chip;
   encapsulating the optical sensor chip and bent arm portion, the encapsulation step including forming a lens in correspondence with the light-sensing area of the optical sensor chip and the aperture of the bent arm portion, the bent arm portion being disposed between the lens and the light-sensing area of the optical sensor chip; and
   attaching a light source module to a portion of the lead frame to form an assembly.

9. The method of claim 8, wherein the step of encapsulating the optical sensor chip includes the step of molding epoxy on sensor chip.

10. The method of claim 8 further comprising fixing a plurality of pins extended from the lead frame onto a circuit board.

11. The method of claim 8 further comprising fixing the assembly onto a holder.

12. The method of claim 11 further comprising fixing the holder onto a base.

13. The method of claim 8 further comprising bending the lead frame at a position between the optical sensor chip and the light source module at an angle that allows the optical sensor chip to sense light emitted from the light source module and reflected from a surface.

14. The method of claim 13, wherein the step of bending the lead frame at an angle includes the step of bending the lead frame to an angle within a range of 60 degrees to 85 degrees.

* * * * *